United States Patent
Heimbruch et al.

[11] Patent Number: 6,109,111
[45] Date of Patent: *Aug. 29, 2000

[54] CONCRETE VIBRATOR MONITOR

[75] Inventors: Glenn A. Heimbruch, Franklin; James Chaplin, Racine, both of Wis.

[73] Assignee: Racine Federated Inc., Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 09/213,784

[22] Filed: Dec. 17, 1998

Related U.S. Application Data

[63] Continuation-in-part of application No. 09/158,427, Sep. 21, 1998, Pat. No. 5,992,238, which is a continuation-in-part of application No. 08/801,797, Feb. 14, 1997, abandoned.

[51] Int. Cl.[7] ............................. G01H 11/02; E01C 19/38
[52] U.S. Cl. .............................. 73/660; 366/123; 404/117
[58] Field of Search ............................. 73/660, 662, 667; 366/120, 123, 128; 404/115, 117; 324/174; 340/683

[56] References Cited

U.S. PATENT DOCUMENTS

| | | | |
|---|---|---|---|
| 3,814,532 | 6/1974 | Barrett et al. | 404/117 |
| 4,057,222 | 11/1977 | Lyle | 366/123 |
| 5,564,824 | 10/1996 | Chaplin et al. | 366/123 |
| 5,618,133 | 4/1997 | Mitsui et al. | 404/117 |
| 5,719,338 | 2/1998 | Magalski et al. | 73/660 |
| 5,983,165 | 11/1999 | Minnich et al. | 404/117 |

OTHER PUBLICATIONS

"Hall Effect Speed Sensing in Gerotor Hydraulic Motors" by James M. Dowling (pp. 61–69). (undated).

Display entitled "Vibrator Speed Control" displayed by Minnich Mfg. at ConExpo–Con/Agg Trade Show, Las Vegas, NV, Mar. 20–24, 1996.

Handout entitled "Check Out This Demonstration . . . of the Smart Hydraulic Paving Vibrator" provided by Wyco Tool Co. at ConExpo–Con/Agg Trade Show, Mar. 20–24, 1996.

Handout entitled "Minnich Introduces . . . Auto Vib" provided by Minnich Mfg. at ConExpo–Con/Agg Trade Show, Mar. 20–24, 1996.

Handout entitled "Auto Vibe II—The 2nd Generation" provided by Minnich Mfg. at World of Concrete Show, Orlando, FL, Jan. 18–21, 1998.

*Primary Examiner*—John E. Chapman
*Attorney, Agent, or Firm*—Wood, Phillips, VanSanten, Clark & Mortimer

[57] ABSTRACT

In a concrete finishing machine having a plurality of vibrators to be at least partially submerged in concrete or other semi-fluid viscous material for vibration thereof, a monitor is provided for displaying and/or recording operational parameters of the plurality of vibrators. The monitor includes a display, responsive to signals generated by sensors operatively associated with the plurality of vibrators, for providing a visual indication of operating parameters for the plurality of vibrators, and a recording device receiving the signals generated by sensors operatively associated with the plurality of vibrators and recording the operating parameters for the plurality of vibrators.

23 Claims, 3 Drawing Sheets

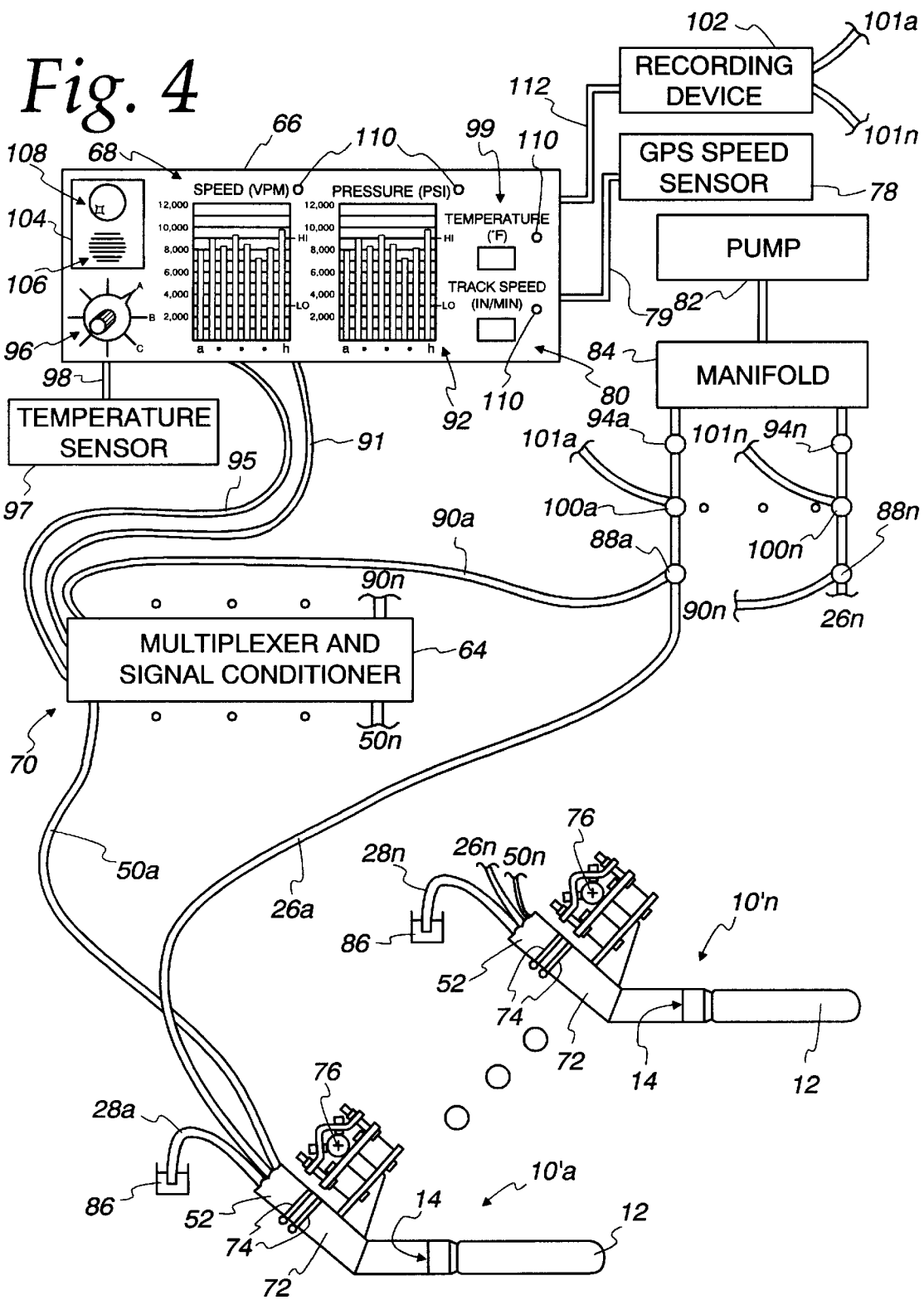

CONCRETE VIBRATOR MONITOR

CROSS-REFERENCE TO RELATED APPLICATIONS

This is a continuation-in-part of Ser. No. 09/158,427, filed Sep. 21, 1998, now U.S. Pat. No. 5,992,238 which is a continuation-in-part of Ser. No. 08/801,797, filed Feb. 14, 1997, now abandoned.

FIELD OF THE INVENTION

The present invention relates to concrete vibrators and monitors such as found on a concrete paving machine, and more particularly to a vibrator monitor for measuring and displaying various operating parameters associated with the concrete vibrators.

BACKGROUND OF THE INVENTION

The use of rotary immersion vibrators to compact unset material, such as concrete, is well-known in the art. Typically, such vibrators are at least partially immersed into concrete which has been poured into forms to build sidewalks, patios, roads, ramps, bridges, etc., so that the concrete can be vibrated to eliminate air pockets and avoid the formation of undesirable pockets or honeycombs which would decrease the structural strength of the concrete. Normally, a plurality of vibrators are provided, as on a concrete paving or finishing machine, with the vibrators, various controls and sensors, paving machine, etc., generally defining a vibration system.

The paving machine "pushes" the plurality of vibrators through the concrete, with the vibration of the vibrators aiding in compacting the concrete, i.e., increasing its strength.

Generally, rotary vibrators include an elongated tubular shaped housing enclosing a rotating eccentric weight which is driven by a motor, normally hydraulic, to generate vibrations. The rotating eccentric weight is normally straddle-mounted by rolling element bearings located at either end of the eccentric weight to transfer the oscillating radial loads from the eccentric weight to the tubular housing.

It is desirable to measure the vibration speed of these rotary vibrators. Optimal vibration speeds can then be determined for achieving maximum structural strength of the concrete which is being vibrated.

Further, with rotary vibrators which use hydraulic motors to drive the rotating eccentric weights, it is also desirable to measure hydraulic fluid flow and pressure to each of the vibrators, as well as the temperature of the hydraulic fluid. Measuring these parameters enables an operator to adjust vibration for maximum structural strength of the concrete being vibrated.

Still further, the industry is moving toward using drier mixes of concrete to achieve higher structural strength. These drier mixes of concrete require higher vibratory forces in order to be adequately compacted. It is therefore important to monitor the vibration speed of the vibrators, as well as the other parameters, to ensure that these high vibratory forces, necessary for the material to be compacted, are being achieved. It is also desirable to measure the rate (speed) at which the vibrators are being "pushed" through the concrete by the paving machine to maximize concrete compactness.

Still further, by monitoring the vibration speed and the other parameters, the life of a vibrator can be more accurately determined. This allows an operator to take precautionary measures, such as replacing a vibrator that is at or near the end of its "life span", in order to avoid shutdown of the paving machine due to vibrator failure, for example.

It is also desirable to provide the parameter measurements in real time to an operator of the system so that deviations from the norm can be acted upon, i.e., corrected, immediately. Further, recording the parameters permits comparative analysis studies to determine optimal operating ranges for different mixes of concrete in different conditions.

It is therefore an object of the invention to provide a concrete vibrator monitor and control providing real time information of system operating parameters, permitting individual modification of the parameters for each vibrator, and alerting a user to deviations from preset operating ranges.

BRIEF SUMMARY OF THE INVENTION

In a concrete finishing machine having a plurality of vibrators to be at least partially submerged in concrete or other semi-fluid viscous material for vibration thereof, a monitor is provided for displaying and/or recording operational parameters of the plurality of vibrators. The monitor includes a display, responsive to signals generated by sensors operatively associated with the plurality of vibrators, for providing a visual indication of operating parameters for the vibrators, and a recording device for recording the operating parameters of the vibrators. The operating parameters include vibrator vibration speed, hydraulic fluid pressure, hydraulic fluid flow rate, hydraulic fluid temperature and track speed.

Each of the hydraulic vibrators includes a housing enclosing a rotating eccentric weight. A hydraulic motor having hydraulic pressure and drain ports connected with hydraulic pressure and drain hoses, respectively, is attached to the housing and drives the rotating eccentric weight. Speed sensors are operably connected to the vibrators for sensing cyclic rotation of the rotating eccentric weight, i.e., vibration speed. The display, responsive to the speed sensors, provides a visual indication of vibration speed for the vibrators, and the recording device records the vibration speed.

The hydraulic pressure hoses receive hydraulic fluid under pressure from a source, with each of the hydraulic pressure hoses including a pressure sensor operably coupled thereto. The display, responsive to the pressure sensors, provides a visual indication of hydraulic fluid pressure for the vibrators, and the recording device records the hydraulic fluid pressure.

Pressure control valves are coupled to each of the hydraulic pressure hoses and are responsive to the pressure signals for modifying the flow of hydraulic fluid for the plurality of vibrators.

Each of the hydraulic pressure hoses includes a flow meter operatively coupled thereto. The display, responsive to the flow meters, provides a visual indication of the hydraulic fluid flow rate for the vibrators, and the recording device records the hydraulic fluid flow rate.

A temperature sensor is provided for determining the temperature of the hydraulic fluid. The display, responsive to the temperature sensor, provides a visual indication of hydraulic fluid temperature, and the recording device records the hydraulic fluid temperature.

A plurality of vibrators are generally pushed through the concrete or semi-fluid viscous material for vibration thereof. The monitor further includes a speed sensor generating a speed signal representative of the speed at which the plurality of vibrators are pushed, i.e., track speed.

The display provides a visual indication of track speed, and the recording device records the track speed.

In another form, the display includes an alarm generating an alarm event if any of the operating parameters for the plurality of vibrators exceeds or falls below respective preset operating ranges. The alarm may include an audio alarm and/or a visual alarm.

In yet another form, the display provides a visual indication of operating parameters for a plurality of vibrators at any one time. A switch is provided on the display for providing a visual indication of the operating parameters for different pluralities of vibrators. In a preferred form, each of the different pluralities is eight.

Other objectives, features and advantages of the present invention will be apparent from the following detailed description taken in conjunction with the accompanying drawings.

BRIEF DESCRIPTION OF THE DRAWINGS

The features of the present invention which are believed to be novel are set forth with particularity in the appended claims. The present invention, together with its objectives and advantages thereof, may best be understood by reference to the following description taken in conjunction with the accompanying drawings, in which like reference numerals identify like elements and in which:

FIG. 4 is a schematic diagram of a vibrator monitor for a plurality of vibrators, as incorporated in a concrete paving machine.

DETAILED DESCRIPTION OF THE INVENTION

Figure 1:
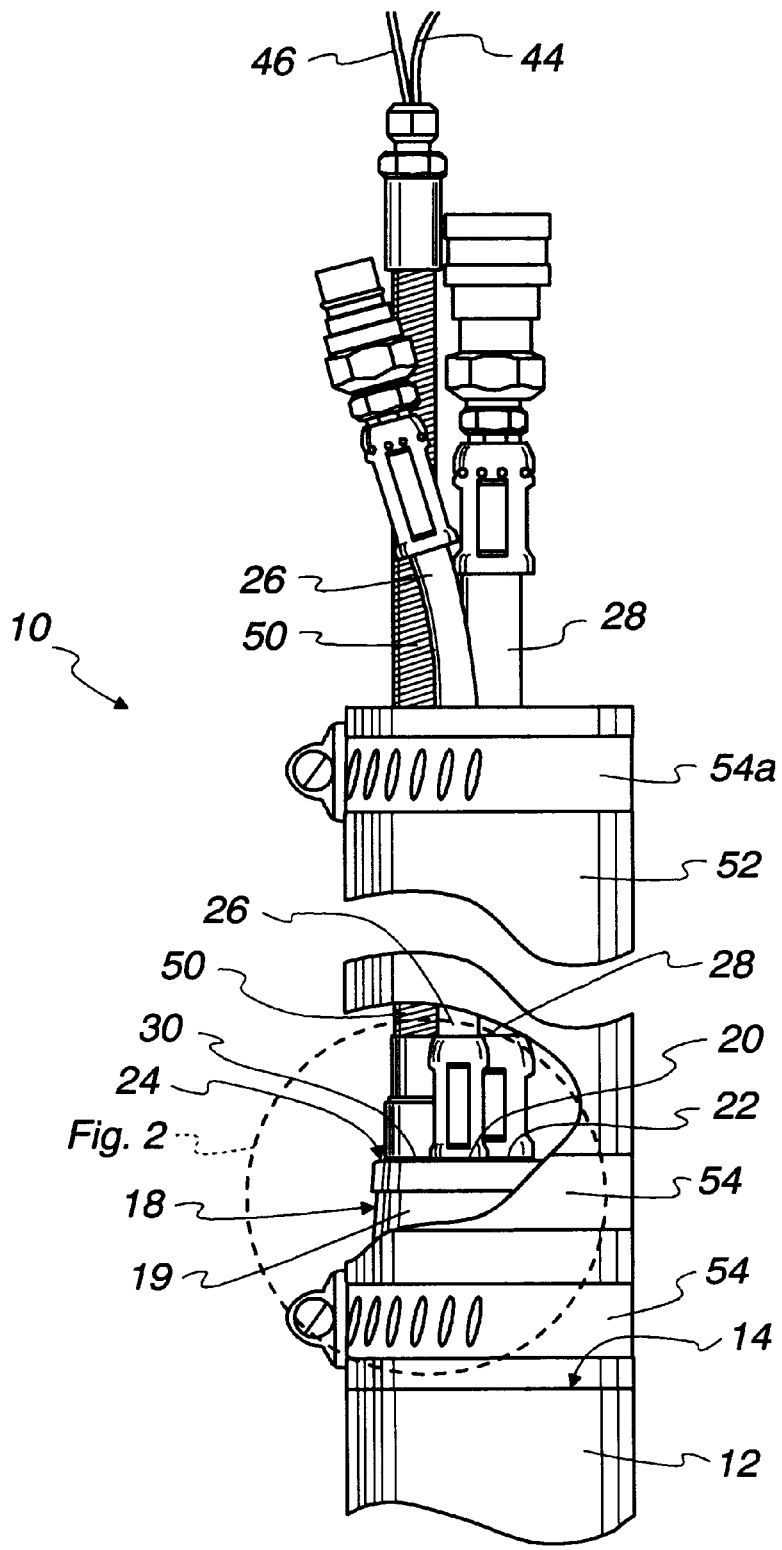
FIG. 1 is a side view of an end portion of a rotary vibrator for use with the present invention, with a portion of a protective shield cut away, depicting attachment of hydraulic pressure/drain hoses and a magnetic pick-up cable to an end wall of the hydraulic motor.

A rotating vibrator, generally indicated at 10 in FIG. 1, has an exterior generally defined by an elongated tubular housing 12, only a portion of which is shown. A rotating eccentric weight and bearing assembly (not shown) are disposed inside housing 12. U.S. Pat. No. 5,564,824 to Chaplin et al, incorporated herein by reference, discloses a preferred eccentric weight and bearing assembly disposed inside a housing that may be implemented with the present invention. The housing 12 may be a metal tube having an open end 14 and a closed end (not shown). Similar to the housing disclosed in Chaplin et al U.S. Pat. No. 5,564,824, the closed end may be integrally formed with housing 12, or may comprise a cap detachably connected to the housing 12.

A hydraulic motor 18 is attached to the open end 14 of housing 12, with a portion of the motor 18 extending into and being surrounded by housing 12. The motor 18 is connected to and drives the rotating eccentric weight. An O-ring (not shown) is provided about motor 18 to completely seal motor 18 against housing 12 and prevent concrete or other semi-fluid or viscous material, into which vibrator 10 is at least partially submerged, from entering housing 12.

In a preferred form, motor 18 has a cylindrical casing 1 9 with hydraulic pressure and drain ports 20,22 formed in end wall 24 of motor 18 opposite the end attached to housing 12. Hydraulic pressure and drain hoses 26,28 are attached to the hydraulic pressure and drain ports 20,22, respectively.

Figure 2:
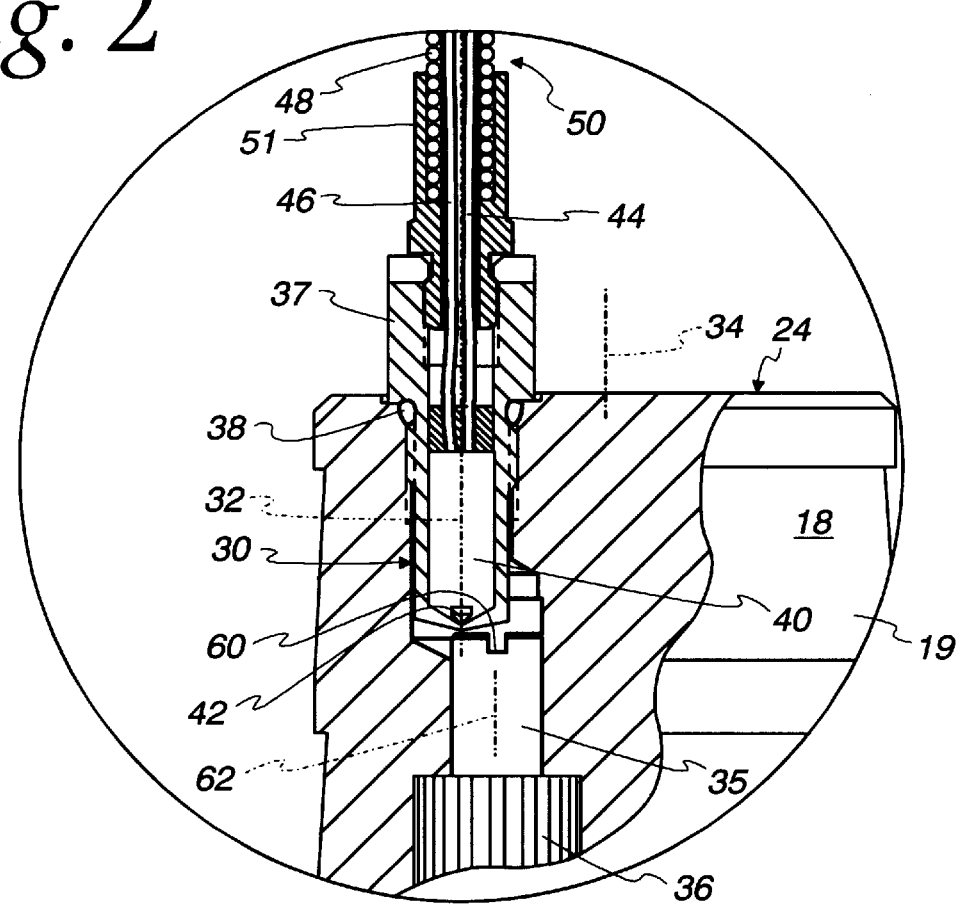
FIG. 2 is an enlarged view of the portion of FIG. 1 indicated by the broken line labelled FIG. 2 with a portion in section and the protective shield and hydraulic pressure/drain hoses removed.
Figure 3:
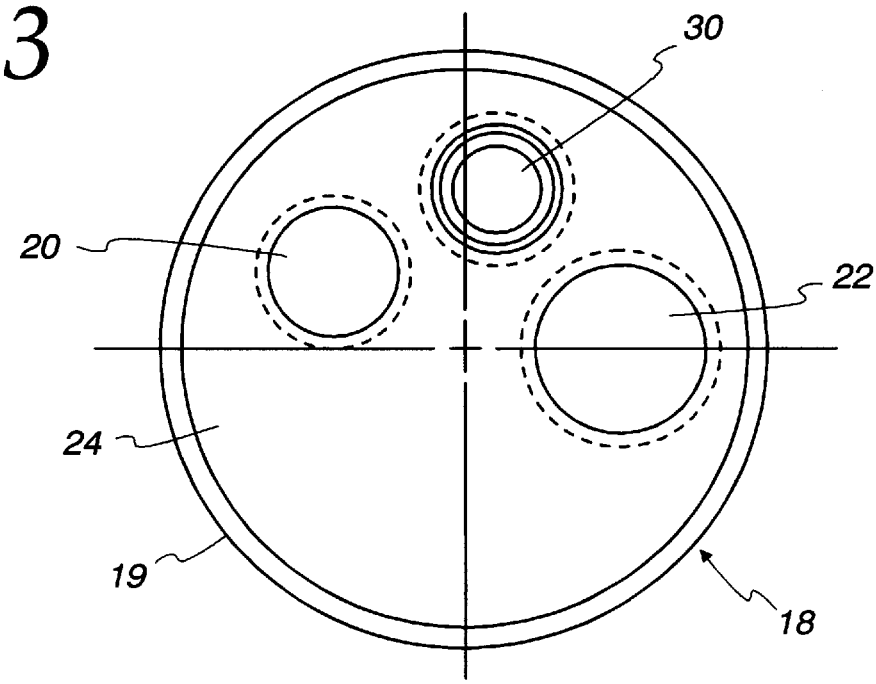
Fig. 3 is an end view of the motor illustrating the placement of the hydraulic pressure/drain and magnetic pick-up ports.

As seen in FIG. 2, an axial bore 30, defining a magnetic pick-up port, is provided in end wall 24 of motor 18. Bore 30 has an axis 32 generally parallel with an axis 34 of housing 12 and motor 18 (in a preferred form, motor 18 and housing 12 have concentric axes), and is disposed between and offset from the hydraulic pressure and drain ports 20,22, as can be best seen in FIG. 3, and adjacent the end of an internal gear shaft 35 extending from internal gear 36 as described below.

A shell 37 is threaded in bore 30. O-ring 38 is provided to seal the motor 18 against leaking and also prevent extraneous hydraulic fluid and/or concrete or other semi-fluid or viscous material from entering the motor 18.

A magnetic pick-up 40 is disposed inside shell 37. Magnetic pick-up 40 may be secured in shell 37 by epoxy or other similar material, and generally includes a coil (not shown) wrapped around a permanent magnet (the tip 42 of the permanent magnet being visible in FIG. 2). Electrical leads 44,46 extend from the coil of magnetic pick-up 40 and are protected by the spiral casing 48 of a Bowden cable 50. Bowden cable 50 is attached to shell 37 via a fitting 51 crimped on to the Bowden cable 50. The crimped fitting 51 is threaded in shell 37, with the Bowden cable 50 extending generally parallel with hydraulic pressure and drain hoses 26,28.

A protective sheath 52 (see FIG. 1) is attached to motor 18 and surrounds Bowden cable 50 and hydraulic pressure and drain hoses 26,28. Preferably the protective sheath 52 is secured at one end to the exposed portion of motor 18 by clamps 54, and is secured to a rubber stopper (not shown), through which Bowden cable 50 and hydraulic pressure/drain hoses 26,28 extend, at the other end by clamp 54a, and protects the hydraulic hoses 26,28 and Bowden cable 50 from the harsh environment in which the vibrator 10 is used.

If a motor housing (not shown) is utilized, the motor housing being attached to the open end 14 of the housing 12 and containing the motor 18, the protective sheath 52 would preferably be attached to the motor housing via clamps 54.

Referring to FIG. 2, bore 30 extends into motor 18 such that the magnetic pick-up 40, when positioned in shell 37 secured in bore 30, is adjacent an end of the internal gear shaft 35 in motor 18. Gear shaft 35 is provided with a radial slot 60 on the end adjacent magnetic pick-up 40. The magnetic pick-up 40 is positioned such that the tip 42 of the permanent magnet is axially adjacent the radially slotted end of gear shaft 35 and radially spaced from the axis 62 of the gear shaft 35. In a preferred form, the axis 62 of gear shaft 35 is generally parallel with axes 32 and 34 of bore 30 and housing 12/motor 18, respectively.

In operation, the gear shaft 35 rotates at a rate which corresponds to the vibration speed of vibrator 10. Rotation of gear shaft 35 is sensed by the adjacent magnetic pick-up 40, and corresponding signals are generated and transmitted from the coil to electrical leads 44,46.

Alternatively, if the gear 36 is so located in the motor 18 that it is accessible with the magnetic pick-up 40, which is preferably mounted in a port in the motor endwall 24, speed sensing may be based on the gear teeth or on a slot or other discontinuity in the gear 36 itself.

As shown in FIG. 4, the signals from the magnetic pick-up 40 are coupled to conventional processing means, including a multiplexer and signal conditioner circuit 64, which determines the vibration speed of vibrator 10 and outputs the result to a display 66 for providing a visual indication 68 of vibration speed.

A vibration monitoring system 70 for multiple vibrators, as on a concrete paving or finishing machine, is depicted in FIG. 4. Such machines typically move along a roadway being paved, spreading and finishing the concrete, and generally include a plurality of angle head vibrators 10'*a*–*n* (where n is any positive integer). Angle head vibrator 10' includes all the elements described with respect to vibrator 10, shown in FIG. 1, further including an angle bracket 72 disposed between housing 12 and protective sheath 52. The open end 14 of housing 12 may be threaded into an end of angle bracket 72, while the protective sheath 52 is secured to the other end of angle bracket 72 by clamps 74. In this configuration, hydraulic pressure and drain hoses 26*a*–*n*, 28*a*–*n* and Bowden cables 50*a*–*n* extend through and are protected by angle brackets 72 and protective sheaths 52.

The plurality of rotary vibrators 10'*a*–*n* are typically attached to a mounting tube 76 or other structural element of the concrete paving machine. The vibrators 10'*a*–*n* are at least partially immersed in the concrete to be vibrated, and are "pushed" through the material by movement of the paving machine. The speed at which the vibrators 10'*a*–*n* are pushed through the concrete is sensed by a GPS speed sensor 78, provided along line 79 to display 66 and displayed at 80 in inches/minute or other suitable units.

Hydraulic fluid is provided to each of the motors 18 of rotary vibrators 10'*a*–*n* via hydraulic pump 82, manifold 84, and hydraulic pressure hoses 26*a*–*n*. The return (drain) hydraulic hoses 28*a*–*n* empty into a reservoir or return sump 86. Pressure sensors 88*a*–*n* are coupled to hydraulic pressure hoses 26*a*–*n* and monitor the pressure level of the hydraulic fluid input to the motors 18 of vibrators 10'*a*–*n*. Pressure sensors 88*a*–*n* coupled to hydraulic pressure lines 26*a*–*n* provide multiplexer and signal conditioner 64 with a signal indicative of the pressure in the respective hydraulic pressure hoses 26*a*–*n* via lines 90*a*–*n*. Multiplexer and signal conditioner 64 outputs the result to display 66, via line 91, which provides a visual indication 92 of hydraulic fluid pressure for the vibrators 10'*a*–*n*. Monitoring the hydraulic pressure of hydraulic pressure lines 26*a*–*n* allows pressure compensating flow control valves 94*a*–*n*, coupled in hydraulic pressure lines 26*a*–*n*, to modify the flow of hydraulic fluid, either automatically or manually, to maintain optimum pressure levels for each vibrator 10'*a*–*n*.

The vibration speed of each motor 18, or vibrator 10'*a*–*n*, is preferably sensed by the combination of the magnetic pick-up 40 and slotted gear shaft 35 as previously described with respect to FIG. 2. The signal sensed by the magnetic pick-up 40 is provided along electrical leads 44,46 which are disposed in Bowden cables 50*a*–*n*. The signals are provided to the multiplexer and signal conditioner circuit 64, which determines the vibration speed of each individual vibrator 10'*a*–*n* and supplies the results, via line 95, to display 66 which displays at 68 the vibration speed for the vibrators 10'*a*–*n*.

The display 66 provides a visual indication of the operating parameters of a limited number of vibrators, although the paving/finishing machine may have several times as many vibrators. A switch 96 selects the group of vibrators whose parameters are displayed.

Each of the displays 68 and 92 is configured to provide visual indications of vibration speed (display 68) and hydraulic fluid pressure (display 92) for a plurality of the vibrators 10'*a*–*n*. As shown in FIG. 4, the display 66 is capable of displaying vibration speed (display 68) and hydraulic fluid pressure (display 92) for a–h vibrators at a time. The switch 96 is provided on the display 66 allowing a system operator to sequentially view vibration speed and/or hydraulic fluid pressure for all of the vibrators 10'*a*–*n*. For example, with the switch 96 in position A, the display 66 displays vibration speed (display 68) and hydraulic fluid pressure (display 92) for the first a–h vibrators 10'*a*–*n*. With switch 96 rotated to position B, the display 66 displays vibration speed (display 68) and hydraulic fluid pressure (display 92) for the next a–h vibrators 10'*a*–*n*, etc. Preferably, vibration speed and hydraulic fluid pressure are displayed for eight of the vibrators 10'*a*–*n* at a time.

Further, while the vibration speed and hydraulic fluid pressure are illustrated on displays 68 and 92 in bar graph type form, other visual representations may be utilized. For instance, vibration speed and hydraulic fluid pressure may be represented in analog form, digital form, or in both digital and analog form. Further, HI/LO indicia may be provided on the display 66 (displays 68 and 92) indicative of whether the vibrator is operating within or outside a preferred operating range.

A temperature sensor 97 is also provided for sensing the temperature of the hydraulic fluid and providing the results along line 98 to display 66, which displays the temperature at 99 in °F. or other suitable units.

Each of the hydraulic pressure lines 26*a*–*n* also includes a flow meter 100*a*–*n* which provides a signal, via lines 101*a*–*n*, indicative of the hydraulic fluid flow rate in the respective hydraulic pressure hose 26*a*–*n* to a recording device 102. However, if so desired, the hydraulic fluid flow rate signals on lines 101*a*–*n* may alternatively be supplied to multiplexer and signal conditioner 64, or other similar signal conditioning circuits, and the hydraulic fluid flow rate for the vibrators 10'*a*–*n* displayed on display 66 in a manner similar to vibration speed and hydraulic fluid pressure.

The display 66 also includes an alarm 104 alerting an operator to a malfunction. The alarm 104 includes one or both of an audible alarm 106, such as a speaker or siren, and a visual alarm 108, such as a light.

The multiplexer and signal conditioner 64 includes HI/LO limit circuits (not shown) setting the high and low limits of the preferred operating ranges for the various parameters. The received vibration signals on lines 50*a*–*n* are compared with appropriate limit circuits to determine if a vibrator 10*a*–*n* is operating outside of the preferred operating range. Operation of a vibrator 10'*a*–*n* above or below the preferred vibration speed range will cause alarm 104 to generate an alarm event alerting the system operator of vibrator malfunction. Upon viewing the display 66, the operator can determine which vibrator 10'*a*–*n* is currently malfunctioning and correct or compensate for the problem. Depending on the severity of the circumstances, the malfunctioning vibrator 10'*a*–*n* could be replaced immediately or replaced during normal system down time.

It should be noted that alarm 104, along the lines as indicated above, may also monitor hydraulic fluid pressure, hydraulic fluid flow rate, hydraulic fluid temperature and track speed. Further, alarm indication lights 110 may be provided adjacent each of the displays 68,80,92,99 for ease of determining where a malfunction is occurring.

All of the information displayed on display 66, including but not limited to vibration speed, hydraulic fluid pressure, hydraulic fluid temperature and track speed, may also be supplied to the recording device 102 via line 112. The information recorded in recording device 102 can be used in a system where the contractor records the precise mix of concrete used and how it was vibrated, along with any other pertinent data, such as environmental conditions, to help in determining optimum vibrational speeds, track speeds, etc., for various conditions. The information can also be processed with an algorithm or look up table to enable an operator to predict the impending failure of a vibrator. This would provide the operator with the opportunity to change or repair the vibrator prior to failure, and could virtually eliminate paving down time due to vibrator failure.

It should be understood that the present invention may be embodied in other specific forms without departing from the spirit or the scope thereof. The present examples, therefore, are to be considered in all respects as illustrative and not restrictive, and the present invention is not to be limited to the details given herein.

What is claimed is:

1. In a concrete finishing machine having a plurality of vibrators to be at least partially submerged in concrete or other semi-fluid viscous material for vibration thereof, each of said plurality of vibrators including a housing enclosing a rotating eccentric weight, and a motor attached to said housing and driving said rotating eccentric weight, each of said plurality of vibrators having a speed sensor operably connected thereto for sensing cyclic rotation of said rotating eccentric weight, said speed sensors generating vibration signals representative of vibration speed for said plurality of vibrators, a monitor comprising:

a display responsive to said vibration signals for providing a visual indication of vibration speed for said plurality of vibrators.

2. The monitor of claim 1, wherein said motor is a hydraulic motor having hydraulic pressure and drain ports connectable with pressure and drain hydraulic hoses, respectively, said hydraulic pressure hoses receiving hydraulic fluid under pressure from a source, with each of said hydraulic pressure hoses including a pressure sensor operably coupled thereto, said pressure sensors generating pressure signals representative of hydraulic fluid pressure for said plurality of vibrators, said display responsive to said pressure signals for providing a visual indication of hydraulic fluid pressure for said plurality of vibrators.

3. The monitor of claim 2, further including pressure control valves coupled to each of said hydraulic pressure hoses and responsive to said pressure signals for modifying the flow of hydraulic fluid for said plurality of vibrators.

4. The monitor of claim 2, further including a temperature sensor generating a temperature signal representative of hydraulic fluid temperature, said display responsive to said temperature signal for providing a visual indication of hydraulic fluid temperature.

5. The monitor of claim 4, further including a recording device connected to said display, said recording device recording the vibration speed and hydraulic fluid pressure for each of said plurality of vibrators, and the hydraulic fluid temperature.

6. The monitor of claim 2, wherein each of said hydraulic pressure hoses includes a flow meter operatively coupled thereto and generating flow signals representative of hydraulic fluid flow rate for said plurality of vibrators, said flow signals being provided to at least one of (a) said display, which is operatively responsive to said flow signals for providing a visual indication of the hydraulic fluid flow rate for said plurality of vibrators, and (b) a recording device for recording the hydraulic fluid flow rate for each of said plurality of vibrators.

7. The monitor of claim 2, wherein said display includes an alarm generating an alarm event if the vibration speed or hydraulic fluid pressure for any of the plurality of vibrators exceeds or falls below a preset operating range.

8. The monitor of claim 7, wherein said alarm comprises at least one of an audio alarm and a visual alarm.

9. The monitor of claim 1, wherein said display provides a visual indication of vibration speed for a plurality of vibrators at any one time.

10. The monitor of claim 9, wherein said display includes a switch for providing a visual indication of vibration speed for different pluralities of vibrators.

11. The monitor of claim 10, wherein each of the different pluralities is eight.

12. The monitor of claim 1, wherein said plurality of vibrators are pushed through the concrete or other semi-fluid viscous material for vibration thereof, said monitor further including a speed sensor generating a speed signal representative of the speed at which said plurality of vibrators are being pushed, said display responsive to said speed signal for providing a visual indication of the speed at which said plurality of vibrators are being pushed.

13. In a concrete finishing machine having a plurality of vibrators to be at least partially submerged in concrete or other semi-fluid viscous material for vibration thereof, a monitor for displaying and/or recording operational parameters of said plurality of vibrators, said monitor comprising:

a display responsive to signals generated by sensors operatively associated with said plurality of vibrators for providing a visual indication of operating parameters for said plurality of vibrators; and a recording device receiving the signals generated by sensors operatively associated with said plurality of vibrators and recording the operating parameters for said plurality of vibrators.

14. The monitor of claim 13, wherein each of said plurality of vibrators includes a housing enclosing a rotating eccentric weight, and a motor attached to said housing and driving said rotating eccentric weight, each of said plurality of vibrators having a speed sensor operably connected thereto for sensing cyclic rotation of said rotating eccentric weight, said speed sensors generating vibration signals representative of vibration speed for said plurality of vibrators, wherein said display is responsive to said vibration signals for providing a visual indication of vibration speed for said plurality of vibrators, and said recording device records the vibration speed for each of said plurality of vibrators.

15. The monitor of claim 14, wherein said motor is a hydraulic motor having hydraulic pressure and drain ports connectable with pressure and drain hydraulic hoses, respectively, said hydraulic pressure hoses receiving hydraulic fluid under pressure from a source, with each of said hydraulic pressure hoses including a pressure sensor operably coupled thereto, said pressure sensors generating pressure signals representative of hydraulic fluid pressure for said plurality of vibrators, wherein said display is responsive to said pressure signals for providing a visual indication of hydraulic fluid pressure for said plurality of vibrators, and said recording device records the hydraulic fluid pressure for each of said plurality of vibrators.

16. The monitor of claim 15, further including pressure control valves coupled to each of said hydraulic pressure hoses and responsive to said pressure signals for modifying the flow of hydraulic fluid for said plurality of vibrators.

17. The monitor of claim 15, wherein each of said hydraulic pressure hoses includes a flow meter operatively coupled thereto and generating flow signals representative of hydraulic fluid flow rate for said plurality of vibrators, wherein said display is responsive to said flow signals for providing a visual indication of hydraulic fluid flow rate for said plurality of vibrators, and said recording device records the hydraulic fluid flow rate for each of said-plurality of vibrators.

18. The monitor of claim 13, wherein said plurality of vibrators are pushed through the concrete or other semi-fluid viscous material for vibration thereof, said monitor further including a speed sensor generating a speed signal representative of the speed at which said plurality of vibrators are being pushed, wherein said display is responsive to said speed signal for providing a visual indication of the speed at which said plurality of vibrators are being pushed through the concrete or other semi-fluid viscous material, and said recording device records the speed at which said plurality of vibrators are being pushed through the concrete or other semi-fluid viscous material.

19. The monitor of claim 13, wherein said display includes an alarm generating an alarm event if any of the operating parameters for said plurality of vibrators exceeds or falls below respective preset operating ranges.

20. The monitor of claim 19, wherein said alarm comprises at least one of an audio alarm and a visual alarm.

21. The monitor of claim 13, wherein said display provides a visual indication of operating parameters for a plurality of vibrators at any one time.

22. The monitor of claim 21, wherein said display includes a switch for providing a visual indication of the operating parameters for different pluralities of vibrators.

23. The monitor of claim 22, wherein each of the different pluralities is eight.

* * * * *